FIG. 1

INVENTOR
Kurt Ziesche
and
Wilhelm Jansen

FIG. 3

April 8, 1958  K. ZIESCHE ET AL  2,829,630
CONTROL DEVICE FOR FUEL INJECTION PUMPS
Filed Dec. 31, 1956  7 Sheets-Sheet 4

INVENTOR
Kurt Ziesche
and
Wilhelm Jansen
By
Patent Agent

April 8, 1958 K. ZIESCHE ET AL 2,829,630
CONTROL DEVICE FOR FUEL INJECTION PUMPS
Filed Dec. 31, 1956 7 Sheets-Sheet 5

FIG. 5

INVENTOR
Kurt Ziesche
and
Wilhelm Jansen
By
Patent Agent

FIG. 6

April 8, 1958 K. ZIESCHE ET AL 2,829,630
CONTROL DEVICE FOR FUEL INJECTION PUMPS
Filed Dec. 31, 1956 7 Sheets-Sheet 7

FIG. 7

INVENTOR
Kurl Ziesche
and
Wilhelm Jansen
By
Patent Agent

United States Patent Office 2,829,630
Patented Apr. 8, 1958

2,829,630

CONTROL DEVICE FOR FUEL INJECTION PUMPS

Kurt Ziesche, Koln-Dunnwald, and Wilhelm Jansen, Koln, Germany, assignors to Klöckner-Humboldt-Deutz Aktiengesellschaft, Koln, Germany Application December 31, 1956, Serial No. 631,703

Claims priority, application Germany January 7, 1956

12 Claims. (Cl. 123—139)

The present invention relates to a control device for fuel injection pumps and, more particularly, concerns a device for fuel injection internal combustion engines for varying the delivery start of the fuel injection pump. In particular, the control device involved in the present case is provided with a centrifugal weight the variable centrifugal force of which during the operation of the internal combustion engine is taken advantage of for effecting a rotation of the cam shaft for the fuel injection pump through a clutch relative to the crank shaft of the engine.

For starting an internal combustion engine, it is not always correct to adjust the ignition point or the start of the injection engine so that the ignition or the fuel injection will occur rather late. If an internal combustion engine is equipped with a control device for adjusting the time of ignition or the start of the fuel injection, such control device will with the machine at a standstill determine the time of ignition or the time of injection in conformity with the lowest speed of operation which means that the ignition or fuel injection will occur at a correspondingly late time of the cycle. Experience has shown that with fuel injection internal combustion engines, especially with diesel engines, the control device adjusts the time for the fuel injection too late when the engine is to be started in cold condition. This is due to the fact that when starting an internal combustion engine, in view of the cold condition and the small feeding speed of the piston of the fuel injection pump, the time lag is high so that the ignition of the fuel occurs too late.

Therefore, efforts have been made to provide means adapted to vary the starting point of the fuel injection normally determined by the control device independently of the latter when the engine is to be started so that the start of the fuel injection during the starting period of the cold engine will be effected earlier. Thus, a hydraulic control device has been developed for the start of the fuel injection which known control device comprises a manually operable lever by means of which the start of the fuel delivery normally controlled by the control device can be adjusted to occur at a more favorable time. In order to allow the operation of said manual lever without encountering a high resistance, this known device is provided with a by-pass passage for the fluid under pressure which passage is controlled by a valve.

It is an object of the present invention to provide a mechanical automatically effective control device for controlling the delivery start of the fuel injection pump in a simple and relatively inexpensive manner so that the time for the delivery start of the fuel pump which is automatically adjusted by the control device can easily be varied for the starting period of the engine.

It is another object of this invention to provide a control device of the above mentioned type provided with a centrifugal weight, in which an adjustment of the centrifugal weights will vary the start of the fuel injection during the starting period of the engine.

These and other objects and advantages of the invention will appear more clearly from the following specification in connection with the accompanying drawings, in which.

General arrangement

The control device according to the present invention is characterized primarily in that it is provided with adjusting members which prior and/or during the starting period of the engine adjust the fly-weight in such a manner that the time for the starting of the delivery of the fuel injection pump will be advanced beyond the normal starting of the fuel injection during normal operation of the engine. The adjustment of the ignition start in connection with the fly-weight has proved particularly advantageous because the fly-weights are easily accessible. The adjustment of the fly-weight furthermore requires only a minimum of elements.

In conformity with a further development of the invention, the adjustment of the fly-weight may be effected by hand, for instance through the intervention of a lever. According to another embodiment of the invention the adjustment of the fly-weight is effected by adjusting elements which are adapted to be actuated through the intervention of a clutch operable by the engine. It is also possible, according to the invention to actuate the adjusting members for the fly-weight by means of an element for instance a thermostat which is responsive to a certain condition of the engine.

After the engine has been started or brought up to its normal speed, the arrangement of the present invention makes it possible that the adjusting members for the fly-weight are returned to a position in which they are ineffective. This may in conformity with the invention be effected by manually adjusting the fly-weight through the intervention of a spring. If the adjusting members for the fly-weight are actuated through a clutch, such clutch may be made ineffective by a certain impulse produced by the internal combustion engine, for instance by oil pressure. The adjustment of the adjusting members for the fly-weight by an element responsive to a certain condition of the engine will following the starting of the engine act in a reverse manner so as automatically to move the adjusting members into an ineffective position similar to the movement of the clutch into ineffective position by oil pressure.

Structural arrangement

Referring now to the drawings, these drawings illustrate four embodiments of the invention in which a fly-weight is movable in radial direction against the thrust of a spring and in which the fly-weight by means of inclined lateral flanks on one hand rests against a clutch member connected to the crank shaft and on the other hand against a clutch member connected to the cam shaft.

Figure 1:
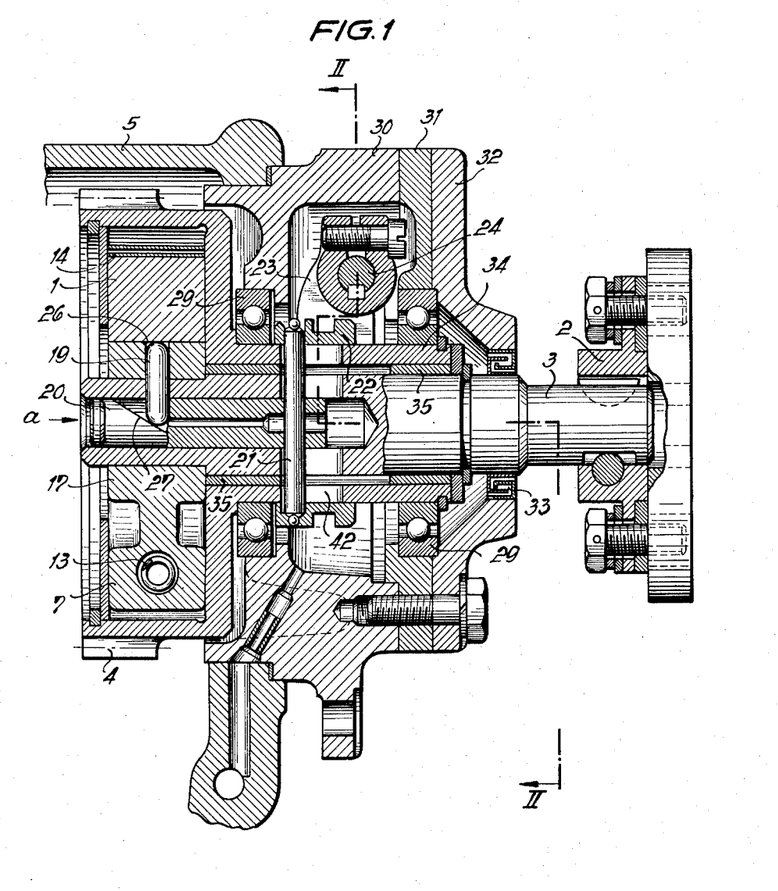
Fig. 1 represents a longitudinal section through a first embodiment of a control device according to the invention.
Figure 2:
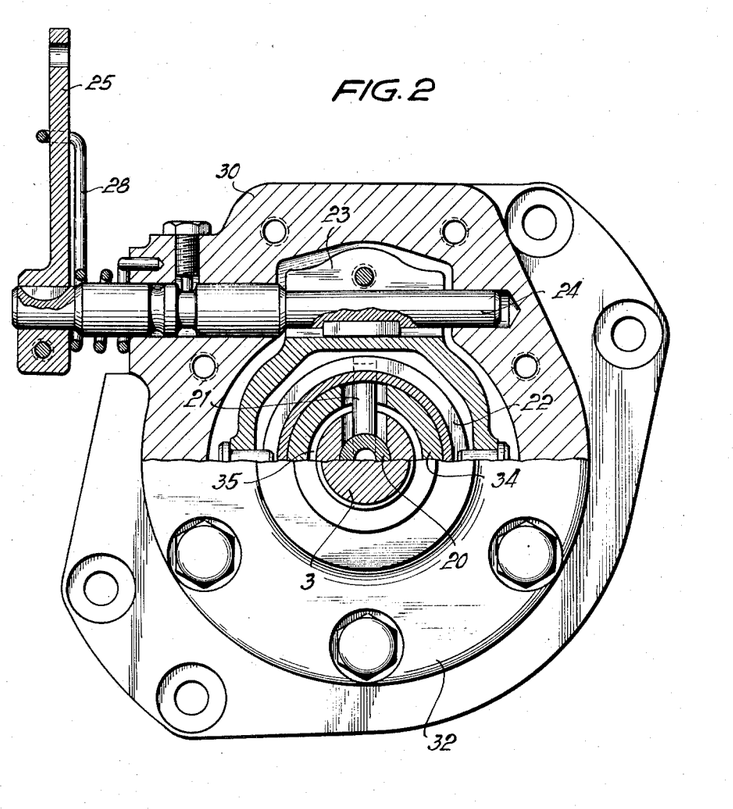
Fig. 2 is a section taken along the line II—II of Fig. 1.
Figure 3:
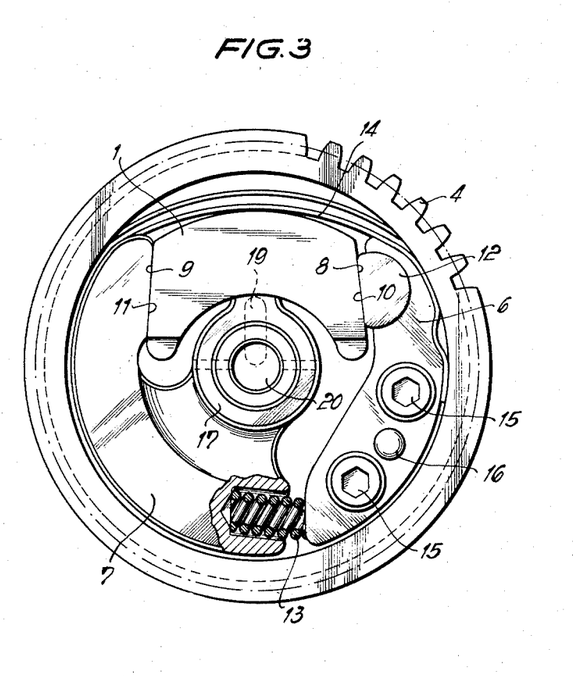
Fig. 3 illustrates a view of the device according to Fig. 1 as seen in the direction of the arrow a on the left-hand side of Fig. 1.
Figure 7:
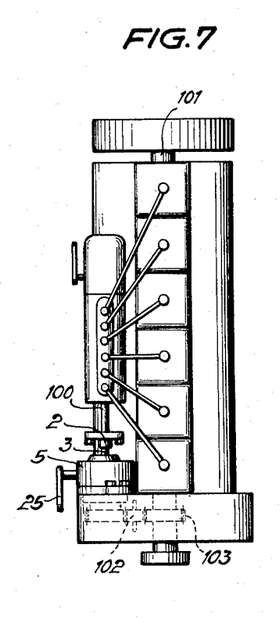
Fig. 7 illustrates on a considerably smaller scale than the preceding figures a top view of the installation and assembly of the entire arrangement.

With specific reference to Figs. 1 to 3, the arrangement shown therein comprises a fly-weight 1 the variable centrifugal force of which is taken advantage of for rotatably adjusting the cam shaft 100 (Fig. 7) for the fuel injection pump relative to the crank shaft 101 of the internal combustion engine. The reference numeral 2 designates one portion of a clutch which conveys driving force from the cam shaft 100 to the fuel injection pump. The clutch portion 2 is keyed to a drive shaft 3 for the cam shaft of the fuel injection pump. The shaft 3 is driven by means of a gear 4 which latter is drivingly connected through gears 102, 103 with the crank shaft 101 of the internal combustion engine. The gear 4 is arranged within the engine casing 5.

As will be seen from Fig. 1, the gear 4 is somewhat bell-shaped and surrounds the fly-weight 1 as well as two coupling members 6, 7 (Fig. 3). The coupling member 6 is connected to the gear 4 for connection with the crank shaft while the coupling member 7 is connected with the drive shaft 3 for connection with the cam shaft of the fuel injection pump. The fly-weight 1 is interposed between the coupling members 6 and 7 as will be evident from Figs. 3 and 6. The fly-weight is provided with tapering end surfaces 8 and 9 for engagement with correspondingly inclined surfaces 10 and 11 of the coupling members 6 and 7. With the coupling member 6, the surface 10 is formed by an adjustable slide member 12 inserted into the coupling member 6. The two coupling members 6 and 7 are under load by a spring 13 interposed therebetween so that said coupling members 6 and 7 have their surfaces 10 and 11 firmly pressed against the end surfaces 8 and 9 of the fly-weight 1. The fly-weight 1 is under load by a leaf spring 14 which continuously urges the fly-weight 1 radially inwardly.

The above mentioned coupling member 6 is connected to the gear 4 by means of screws 15 (Fig. 3). The coupling member 6 and the gear 4 are fixed relative to each other in a certain position by means of a pin 16. With the embodiment of Figs. 1 to 3, the hub 17 of the coupling member 7 is shrunk onto the shaft 3 so as to be fixedly rotatably connected therewith.

The device according to Figs. 1 to 3 operates in such a manner that the fly-weight 1 acts upon the surfaces 10 and 11 of the coupling members 6 and 7 in view of the centrifugal force varying with changing speed of rotation of the internal combustion engine so that the coupling members 6 and 7 are turned relative to each other when the fly-weight 1 moves in radial direction. In this way, the cam shaft of the fuel injection pump is moved into a different angular position with regard to the crank shaft thereby causing a change in the delivery start of the fuel pump in such a manner that at high speed the delivery of the fuel pump starts earlier than will be the case at low speed. Figs. 1 and 3 show the fly-weight 1 in a position which it will occupy when the machine is at a standstill. It is in this position that the fly-weight has the least distance from the longitudinal central axis of shaft 3.

With the device according to Figs. 1 to 3, adjusting members are provided by means of which it is possible to adjust the fly-weight 1 so as to advance the delivery start of the fuel injection pump. These adjusting members comprise a pin 19, a sliding bolt 20, a traverse 21, a sleeve 22, an adjusting fork 23, a bolt 24, and a lever 25. Pin 19 is radially guided in a bore 26 of the shaft 3 and of the hub 17 of the coupling member 7 and has its outer end in abutment with the inner side of the fly-weight 1, whereas its inner end engages an inclined surface 27 of the sliding bolt 20. The sliding bolt 20 is adapted by means of the traverse 21, sleeve 22, adjusting fork 23, bolt 24 and lever 25 to be moved back and forth in the direction of the longitudinal central axis of shaft 3.

The inclined surface 27 is so arranged that it acts upon the pin 19 and moves the latter back and forth in bore 26. Inasmuch as the outer end of pin 19 engages the inside of the fly-weight 1, it is also possible to displace the fly-weight in radial direction by means of the members 19 to 25, and more specifically from the inner position of the fly-weight as shown in the drawing into a further outward position which corresponds to a more favorable delivery start of the fuel injection for the starting period of the engine.

In order that following the starting of the engine, the fly-weight 1 will again have available its full range of movement, provision has been made that following the starting of the internal combustion engine, the adjusting members 19 to 25 be returned by a spring 28 (Fig. 2) into a position in which said adjusting members are ineffective.

It is also to be noted that the gear 4 and the shaft 3 are journalled in anti-friction bearings 29 which are mounted in a casing 30 which is flanged to the machine housing 5. The casing 30 is provided with a holding ring 31 for one of the bearings 29 and is closed by a lid 32 which surrounds shaft 3 by means of a seal 33. The journalling of the gear 4 and the shaft 3 is so effected that shaft 3 is located in a hollow shaft-like extension 34 of the gear 4. Bearing bushings 35 are interposed between shaft 3 and hollow shaft 34. The hollow shaft 34 is directly surrounded by the inner race rings of the anti-friction bearings 29. The adjusting fork 23 is arranged within the casing 30. The bolt 24 is journalled in the casing 30 and extends outwardly therefrom (Fig. 2) so that by means of a hand lever 25 fixedly connected to the bolt 24 it is possible to rotate the latter.

Figures 4, 8:
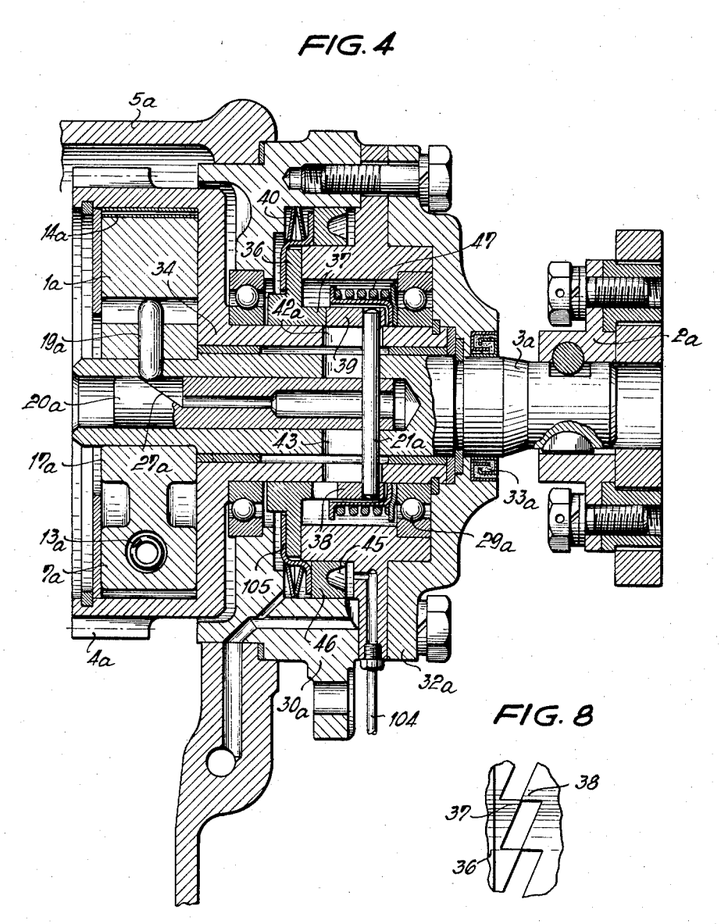
Fig. 4 represents a longitudinal section through a second embodiment of a control device according to the invention.
Fig. 8 illustrates clutch jaws used in connection with the present invention.

The arrangement according to Fig. 4 likewise has the hub 17a of the coupling member 7a shrunk to the shaft 3a. The arrangement of Fig. 4 differs from that of Figs. 1 to 3 primarily in that the displacement of the sliding bolt 20a in the direction of the longitudinal axis of shaft 3a by means of the traverse 21a is not effected manually but by a coupling controlled by the engine. This coupling consists of a ring 36 surrounding the hollow shaft 34a and provided with wedge-shaped jaws 37 for engagement with similar wedge-shaped jaws 38 of a sleeve 39 which engages the traverse 21a. When the machine is at a standstill, the ring 36 due to a disc spring 40 firmly engages the annular member 41 which is connected to the casing portion 30a. The wedge-like coupling jaws 37 and 38 (Fig. 8) are so designed that during the starting operation of the engine and the rotation of the sleeve 39 caused thereby, the sleeve 39 moves toward the right and thereby also moves the traverse 21a which is fixedly mounted in the sliding bolt 20a and pulls the latter toward the right with regard to the drawing. The sliding bolt 20a then similar to the embodiments of Figs. 1 to 3 acts upon the pin 19a. The drive of the sleeve 39 is effected by shaft 3a through the traverse 21a. The traverse 21a is located in a recess 43 of the shaft 3a. The hollow shaft 34a is provided with a bore 42 which in circumferential direction is so dimensioned that the hollow shaft 34a can freely move with regard to the traverse 21a. This is particularly evident in Fig. 2 at 44 with regard to shaft 34 and bolt 42.

After the internal combustion engine has been started, the coupling ring 36 is made ineffective by the pressure of the lubricating oil of the internal combustion engine so that pin 19a and sliding bolt 20a are returned to a position in which they are ineffective. The oil under pressure is conveyed through a conduit 104 into an annular chamber 45 where it acts upon a grooved ring 46 so that the latter is displaced leftwardly with regard to Fig. 4 against the pressure of the disc spring 40. It will be evident that in these circumstances also the ring 105 between the grooved ring 46 and the disc spring 40 will move toward the left and release the ring 36 so that the latter can freely rotate. When the machine is at a standstill, the ring 36 cannot freely rotate because the oil pressure does not act upon the grooved ring 46 so that therefore the disc spring 40 presses ring 36 against the stationary part 41 through the intervention of the dish-shaped ring 105 located between disc spring 40 and grooved ring 46. In this condition of operation, the coupling jaws 37 of ring 36 form a fixed bearing on which the coupling jaws 38 (see Figs. 4 and 8) of the sleeve 39 lift themselves up so that the sliding bolt 20a moves into the position shown in Fig. 4. It will be appreciated that the disc spring 40 remains compressed by the oil pressure as long as the engine is running and lubricating oil pressure prevails in the chamber 45. A spring 47 brings about that the sleeve 39, the traverse 21a and the sliding bolt 20a are displaced toward the left while the engine is running so that the pin 19a remains ineffective.

Figure 5:
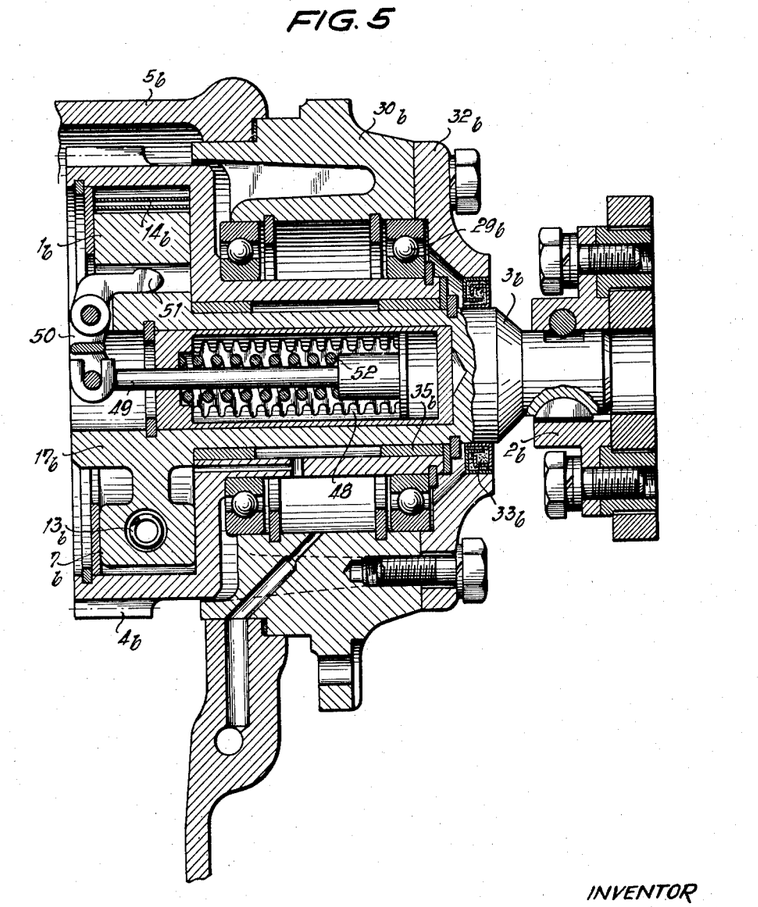
Fig. 5 is a vertical longitudinal section through still another modifiaction of a control device according to the invention.
Figure 6:
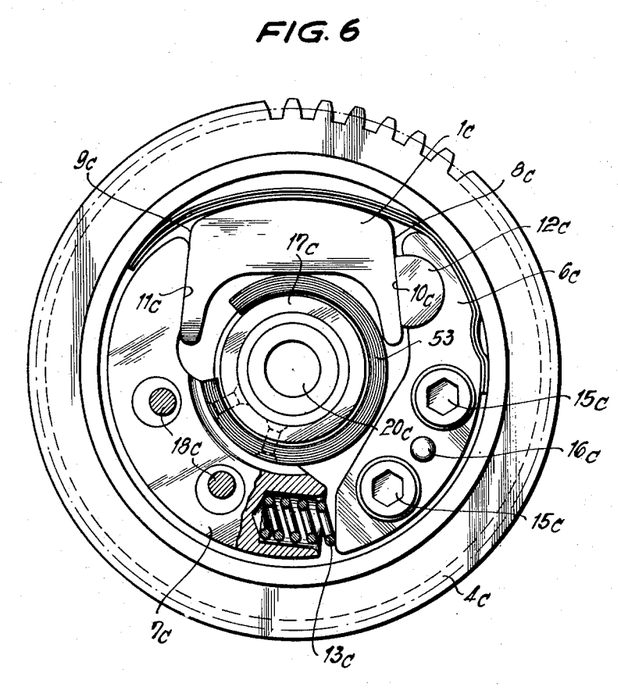
Fig. 6 represents a view of a modified arrangement as seen in the direction of its longitudinal central axis when looking upon the side where the fly-weight is located.

With the embodiment of Fig. 5 the coupling member 7 is made in one piece with the shaft 3, whereas with the embodiment of Fig. 6 the coupling member 7 is connected to shaft 3 by means of screws 18. The embodiments of Figs. 5 and 6 are provided with a thermostat responsive to a certain heat condition of the engine. It is this thermostat which brings about the necessary correction for the time of ignition during the starting of the engine. According to Fig. 5, the thermostat consists of a metallic bellows 48 which responds to the temperature of the lubricating oil of the internal combustion engine and through the intervention of a pin 49 acts upon a bell crank lever 50 having its inner free end 51 in engagement with the inner side of the fly-weight 1b. A further spring 52 moves pin 49 toward the right when the engine is at a standstill so that the fly-weight will be adjusted toward the outside by lever 50 by a certain amount. The arrangement of the thermostat 48 is such that with increasing temperature of the lubricating oil, the spring 52 is compressed so that pin 49 moves toward the left and bell crank lever 50 is brought into a position in which the entire adjusting stroke for the fly-weight 1b is released. The thermostat 48 is preferably filled with a liquid which at a certain temperature of the lubricating oil becomes gaseous and thereby brings about a considerable increase in pressure in the thermostat 48.

With the embodiment according to Fig. 6, a bi-metal strip 53 connected to the hub of the coupling member 7c acts directly upon the fly-weight 1c. The bi-metal strip is so arranged that when the engine is cold, its diameter increases and when the engine warms up, its diameter decreases. When the engine is to be started, this bi-metal strip thus automatically adjusts the fly-weight 1c toward the outside into a position which will be more favorable for the starting of the engine.

While with the embodiment according to Fig. 5 the return of the bell crank lever 51 is automatically effected by the thermostat 48, with the arrangement according to Fig. 6 no additional adjusting members are provided for the fly-weight 1c. The bi-metal strip 53 determines by itself the proper position of the fly-weight during the starting of the engine and releases the entire adjusting stroke for the fly-weight during the operation of the engine.

It is, of course, to be understood that the present invention is, by no means, limited to the particular construction shown in the drawings but also comprises any modifications within the scope of the appended claims.

What we claim is:

1. In a device for use in connection with an internal combustion engine having a cam shaft for controlling a fuel injection pump, a crank shaft for conveying driving power to said cam shaft, and a fly-weight adapted through a clutch to vary the angular position of said cam shaft relative to said crank shaft in response to centrifugal forces acting upon and varying the position of said fly-weight: adjusting means engaging said fly-weight and operable to adjust the position of said fly-weight independently of said centrifugal forces for facilitating the starting of said engine.

2. A device for use in connection with an internal combustion engine having a cam shaft for controlling a fuel injection pump, a crank shaft for conveying driving power to said cam shaft, and a fly-weight adapted through a clutch to vary the angular position of said cam shaft relative to said crank shaft in response to centrifugal forces acting upon and varying the position of said fly-weight, the combination of: adjusting means engaging said fly-weight and operable to adjust the position of said fly-weight, and means independent of said centrifugal forces and operable to actuate said adjusting means to thereby cause said fly-weight to bring about a change in the relative positions of said cam shaft and said crank shaft for facilitating the starting of said engine.

3. A device for use in connection with an internal combustion engine having a fuel injection pump, a cam shaft controlling the delivery of said pump and a crank shaft for conveying driving power to said cam shaft, the combination of: a first coupling member drivingly connected to said crank shaft, a second coupling member drivingly connected to said cam shaft, a fly-weight interposed between said first and second coupling members and provided with tapering surfaces slidably engaging correspondingly tapered surfaces of said first and second coupling members respectively to vary the positions of said coupling members relative to each other in response to a sliding movement of said fly-weight between said coupling members in radial inward and outward direction, first spring means for continuously maintaining the tapering surfaces of said fly-weight in sliding contact with the tapered surfaces of said coupling members, second spring means continuously urging said fly-weight radially inwardly, and means operatively connected to said fly-weight and operable during the standstill of said engine to move said fly-weight radially outwardly to thereby bring about a change in the relative position of said coupling members and thereby of said cam shaft and said crank shaft.

4. A device for use in connection with an internal combustion engine having a fuel injection pump, a cam shaft controlling the delivery of said pump and a crank shaft for conveying driving power to said cam shaft, the combination of: a first coupling member drivingly connected to said crank shaft, a second coupling member drivingly connected to said cam shaft, a fly-weight interposed between said first and second coupling members and provided with tapering surfaces slidably engaging correspondingly tapered surfaces of said first and second coupling members respectively to vary the positions of said coupling members relative to each other in response to a sliding movement of said fly-weight between said coupling members in radial inward and outward direction, first spring means for continuously maintaining the tapering surfaces of said fly-weight in sliding contact with the tapered surfaces of said coupling members, second spring means continuously urging said fly-weight radially inwardly, and manually operable lever means operatively connected to said fly-weight and operable during the standstill of said engine to move said fly-weight radially outwardly to thereby bring about a change in the relative position of said coupling members and thereby of said cam shaft and said crank shaft.

5. A device for use in connection with an internal combustion engine having a cam shaft for controlling a fuel injection pump, a crank shaft for conveying driving power to said cam shaft, and a fly-weight adapted through a clutch to vary the angular position of said cam shaft relative to said crank shaft in response to centrifugal forces acting upon and varying the position of said fly-weight, the combination of: adjusting means engaging said fly-weight and operable to adjust the position of said fly-weight, and coupling means drivingly connected to said crank shaft and operable in response to the starting movement of said crank shaft to actuate said adjusting means to thereby through the intervention of said fly-weight bring about a change in the relative positions of said cam shaft and said crank shaft for facilitating the starting of said engine.

6. A device for use in connection with an internal combustion engine having a cam shaft for controlling a fuel injection pump, a crank shaft for conveying driving power to said cam shaft, and a fly-weight adapted through a clutch to vary the angular position of said cam shaft relative to said crank shaft in response to centrifugal forces acting upon and varying the position of said fly-weight, the combustion of: adjusting means engaging said fly-weight and operable to adjust the position of said fly-weight, and temperature responsive means operatively connected to said adjusting means and operable in response to a certain temperature condition in said engine to actuate said adjusting means.

7. A device for use in connection with an internal combustion engine having a cam shaft for controlling a fuel injection pump, a crank shaft for conveying driving power to said cam shaft, and a fly-weight adapted through a clutch to vary the angular position of said cam shaft relative to said crank shaft in response to centrifugal forces acting upon and varying the position of said fly-weight, the combination of: adjusting means engaging said fly-weight and operable to adjust the position of said fly-weight, means independent of said centrifugal forces and operable to actuate said adjusting means to thereby through the intervention of said fly-weight bring about a change in the relative positions of said cam shaft and said crank shaft for facilitating the starting of said engine, and spring means operatively connected to said adjusting means and operable following the starting of said engine to move said adjusting means into an ineffective position.

8. A device for use in connection with an internal combustion engine having a cam shaft for controlling a fuel injection pump, a crank shaft for conveying driving power to said cam shaft, and a fly-weight adapted through a clutch to vary the angular position of said cam shaft relative to said crank shaft in response to centrifugal forces acting upon and varying the position of said fly-weight, the combination off: adjusting means engaging said fly-weight and operable to adjust the position of said fly-weight, means independent of said centrifugal forces and operable to actuate said adjusting means to thereby through the intervention of said fly-weight bring about a change in the relative positions of said cam shaft and said crank shaft for facilitating the starting of said engine, and means operatively connected with said adjusting means and operable by said engine following the starting thereof to make said adjusting means ineffective.

9. A device for use in connection with an internal combustion engine having a cam shaft for controlling a fuel injection pump, a crank shaft for conveying driving power to said cam shaft, and a fly-weight adapted through a clutch to vary the angular position of said cam shaft relative to said crank shaft in response to centrifugal forces acting upon and varying the position of said fly-weight, the combination of: adjusting means engaging said fly-weight and operable to adjust the position of said fly-weight, means independent of said centrifugal forces and operable to actuate said adjusting means to thereby through the intervention of said fly-weight bring about a change in the relative positions of said cam shaft and said crank shaft for facilitating the starting of said engine, and means operatively connected to said adjusting means and responsive to a certain oil pressure developed by said engine to move said adjusting means into ineffective position.

10. A device for use in connection with an internal combustion engine having a fuel injection pump, a cam shaft controlling the delivery of said pump and a crank shaft for conveying driving power to said cam shaft, the combination of: a first coupling member drivingly connected to said crank shaft, a second coupling member drivingly connected to said cam shaft, a fly-weight interposed between said first and second coupling members and provided with tapering surfaces slidably engaging correspondingly tapered surfaces of said first and second coupling members respectively to vary the positions of said coupling members relative to each other in response to a sliding movement of said fly-weight between said coupling members in radial inward and outward direction, first spring means for continuously maintaining the tapering surfaces of said fly-weight in sliding contact with the tapered surfaces of said coupling members, second spring means continuously urging said fly-weight radially inwardly, a movable member engaging said fly-weight and movable from a normally ineffective position into position for displacing said fly-weight in radial direction, and means operable while said engine is at a standstill to move said movable member from its ineffective position into effective position by the displacement of said fly-weight to bring about a change in the positions of said cam shaft and said crank shaft relative to each other.

11. A device for use in connection with an internal combustion engine having a fuel injection pump, a cam shaft controlling the delivery of said pump, and a crank shaft for conveying driving power to said cam shaft, the combination of: a first coupling member drivingly connected to said crank shaft, a second coupling member drivingly connected to said cam shaft, a fly-weight interposed between said first and second coupling members and provided with tapering surfaces slidably engaging correspondingly tapered surfaces of said first and second coupling members respectively to vary the positions of said coupling members relative to each other in response to a sliding movement of said fly-weight between said coupling members in radial inward and outward direction, first spring means for continuously maintaining the tapering surfaces of said fly-weight in sliding contact with the tapered surfaces of said coupling members, second spring means continuously urging said fly-weight radially inwardly, a pin extending in radial direction and having one end in engagement with the inside of said fly-weight, an actuating member movable in a direction perpendicular to said radial direction and provided with an inclined surface engaging the other end of said pin, a sleeve member provided with a helix-like flank, spring means continuously urging said actuating member into contact with said flank, coupling means connecting said sleeve with said cam shaft to move said sleeve in response to the starting of said engine, and means responsive to a certain oil pressure in said engine for making said coupling means ineffective.

12. A device for use in connection with an internal combustion engine having a cam shaft for controlling a fuel injection pump, a crank shaft for conveying driving power to said cam shaft, and a fly-weight adapted through a clutch to vary the angular position of said cam shaft relative to said crank shaft in response to centrifugal forces acting upon and varying the position of said fly-weight, the combination of: adjusting means engaging said fly-weight and operable to adjust the position of said fly-weight, and thermostatic means acting upon the inside of said fly-weight and designed in cold condition of said engine to move said fly-weight radially outwardly thereby effecting a change in the relative positions of said cam shaft and said crank shaft for facilitating the starting of said engine in cold condition, said thermostatic means being ineffective in response to a certain heated-up temperature of said engine.

No references cited.